April 5, 1966            H. WEY            3,244,076
ARRESTER DEVICE FOR PIVOTABLE COMPONENTS OF A GUN MOUNTING
Filed Aug. 27, 1964            3 Sheets-Sheet 1
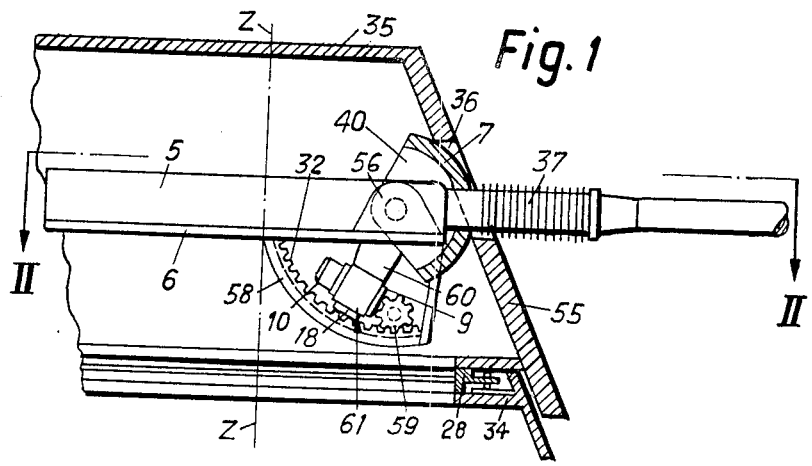
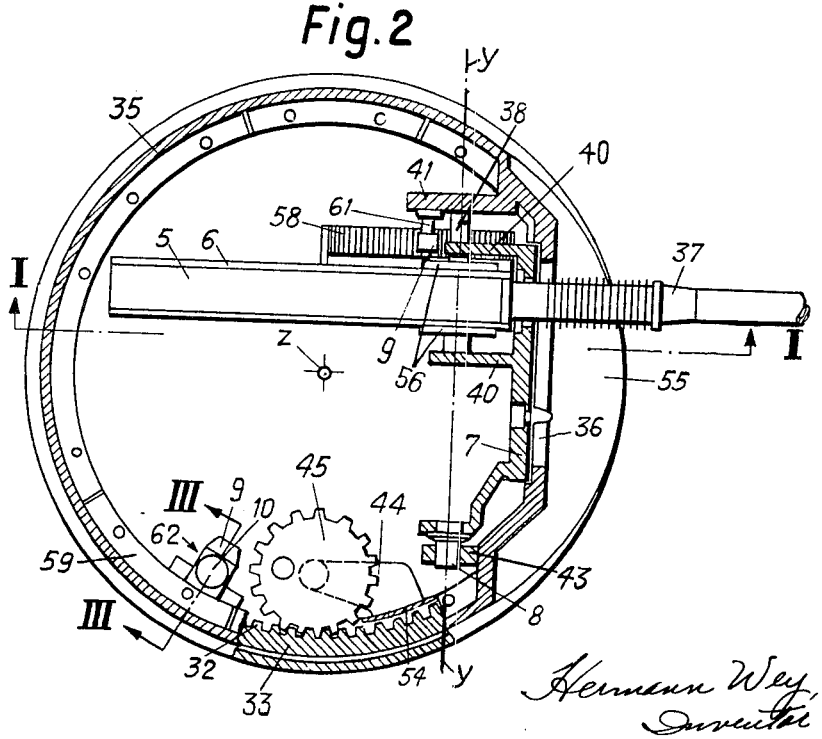

United States Patent Office 3,244,076
Patented Apr. 5, 1966

3,244,076
ARRESTER DEVICE FOR PIVOTABLE COMPONENTS OF A GUN MOUNTING
Hermann Wey, Wallisellen, Switzerland, assignor to Machine Tool Works Oerlikon, Administration Company, Zurich-Oerlikon, Switzerland
Filed Aug. 27, 1964, Ser. No. 392,518
Claims priority, application Switzerland, Aug. 30, 1963, 10,778/63
2 Claims. (Cl. 89—37)

The present invention relates to a gun mounting and more particularly to an arrester device provided with a toothed rack for the components pivotable about an axis of a gun mounting.

The primary object of the invention is to provide an arrester device of the kind referred to wherein the pivotable part can be arrested in any position desired independently of the tooth pitch of said tooth rack.

A further object of the invention is to provide an arrester device of the kind referred to wherein the pivotable component is not arrested rigidly relative to its carrier but is capable of performing small amplitude rotational oscillations which are quickly damped by the arrester device.

With this and other objects in view which will become apparent later from this specification and the accompanying drawings I provide in a gun mounting a carrier having an axis, a component carried by said carrier pivotally about said axis, locking means for arresting said pivotable component relative to said carrier, said locking means comprising an arc-shaped toothed rack attached on said carrier co-axially with said axis, a locking member movably arranged on said pivotable component and adjustable in the radial direction relative to the teeth of said toothed rack, and a resilient body attached to said locking member and extending in the circumferential direction of said toothed rack over several teeth thereof, said body coming into contact with the teeth of said toothed rack when moving said locking member radially towards said rack.

According to additional features of the invention a recess is provided in said locking member, said resilient body being fitted in said recess and protruding beyond the same, whereby a resiliency of said body in the direction towards the toothed rack is attained. This non-rigid arresting of the components movable relative to one another is of particular advantage for gun-mountings in which the cradle carrying the weapon is arranged eccentrically relative to the azimuth setting axis, and wherein consequently large moments arise about the azimuth axis when firing a shot, which moments have to be taken by those parts of the gun-mounting which do not take part in the azimuth setting movement of the gun-mounting.

These and other features of my said invention will be clearly understood from the following description of a preferred embodiment thereof, given by way of example with reference to the accompanying drawings, in which:

FIG. 1 is a diagrammatic vertical section of the armour cupola of a gun mounting on the line I—I of FIG. 2;

FIG. 2 is a horizontal section on the line II—II of FIG. 1 with part of the azimuth setting mechanism;

Figure 3:
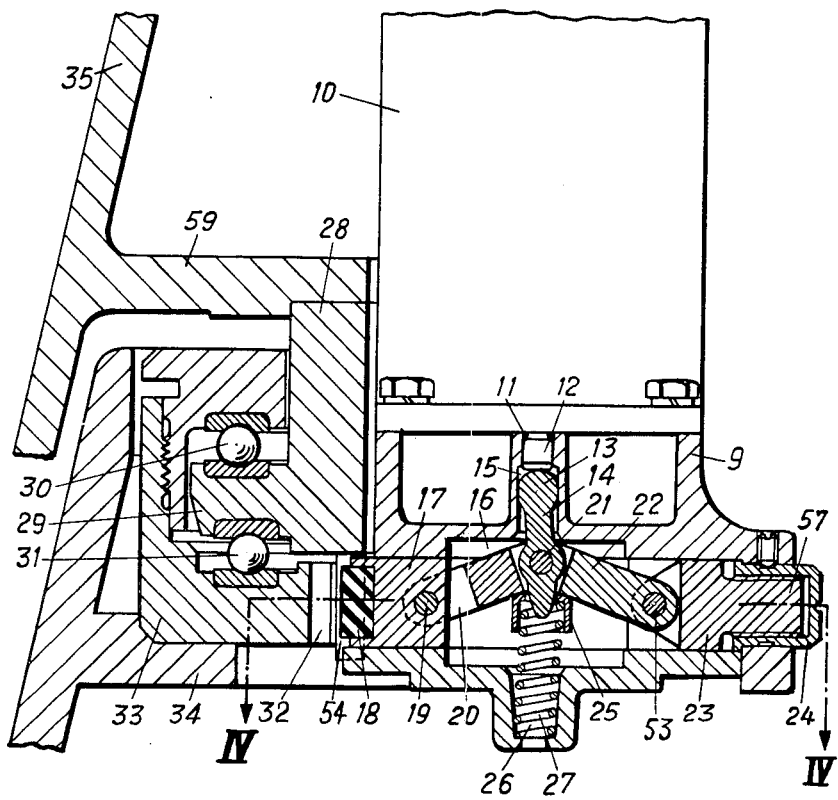
FIG. 3 is a section on a larger scale on the line III—III of FIG. 2.

From FIGS. 1 and 2 the general arrangement is shown of a cradle 6 with the weapon mounted on it within an armour cupola 35. On the breech box 5 of the weapon the gun barrel 37 is fixed, which protrudes through a window 36 in the forward closure wall 55 of the armour cupola 35.

Hereinafter, with reference to FIGS. 2–4, the arrester device 62 for the azimuth setting mechanism will be described. In accordance with FIG. 3, on a carrier ring 28 a flange 29 is arranged jutting out radially outward, whose upper and lower sides form races for two rows of balls 30, 31, respectively. The flange 29 projects into a likewise annular support 33, which consists in two parts provided with an internally toothed crown 32 and is fixedly connected with the chassis 34 of an armoured vehicle otherwise not shown. The armour cupola 35 rests by means of an inwardly projecting flange 59 on the carrier ring 28, to which it is screwed. This cupola is provided at one place with a window 36, and forms there an arcuate guide for a blind 7, through which projects the gun barrel 37. The cradle 6 is provided, as shown in FIGS. 1 and 2, with two brackets 56, each of which is fixedly connected with a holder 40 projecting inwardly from the blind. The blind 7 is pivotally mounted in two bearings 41 and 43 provided on the cupola 35 by means of two trunnions 8 and 38, of which the latter is fixed on one of the holders 40. The common axis of the trunnions 8 and 38 forms the elevation setting axis y—y of the gun.

As moreover follows from FIGS. 1 and 2, the carrier ring 28 is provided with a downwardly projecting flange 54, on which an arm 44 is fixed, in the free end of which a manually operated toothed gear is journalled rotatably, which protrudes through a cut-out in the flange 54 and meshes with the toothed crown 32 forming a curved toothed rack and constitutes with the same the azimuth setting mechanism. The axis of the weapon lies at a certain off-set from the axis of rotation of the body 28, which forms the azimuth setting axis z—z of the gun.

On the flange 54 a casing 9 is screwed or by means of screws 46, on which casing a solenoid 10 (not shown in detail) is fixed. In a guide 11 of the casing 9 a stem 12 of the solenoid is guided slidably, whose lower end is juxtaposed to the spherical end 13 of a link 14. The head 13 of this link is guided in a further guide 15, which is enlarged as compared with the guide 11 and forms a continuation thereof. The lower, thinner part of the link 14 can accordingly perform small swivelling movement about the head 13 in this guide 15. The lower end of the link 14 projects into an oblong chamber 16 of the casing 9 which extends in the radial direction and opens toward the toothed crown 32. In this chamber 16 a locking member 17 is mounted radially movable, which has a frontal face provided with a recess 42, into which a lining 18 is inserted consisting of a compact rubber body of a compressive strength of about 200 kilograms per square centimetre, whose length amounts to a multiple of the tooth pitch of the crown 32, and which protrudes freely beyond the recess. The locking member 17 reaches through a cut-out 155 in the flange 54, and accordingly its lining 18 can come into contact with the toothed crown 32.

Figure 4:
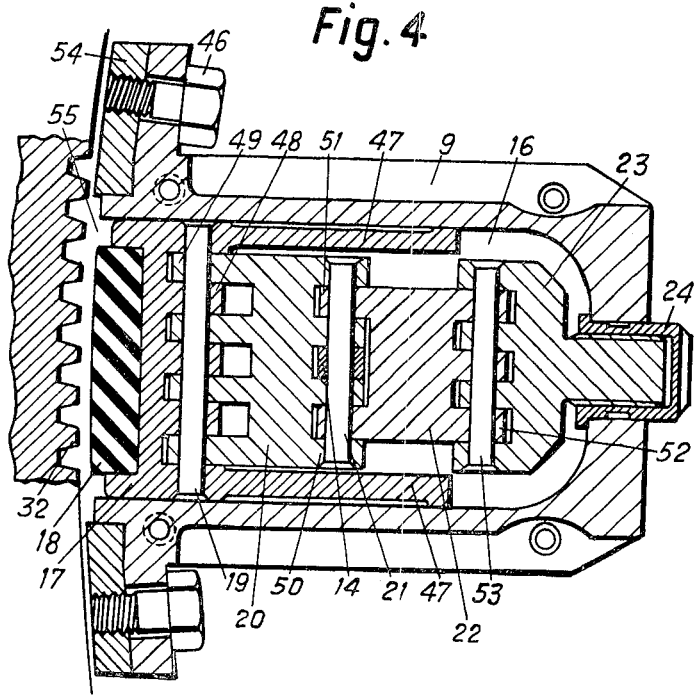
FIG. 4 is a horizontal section on the line IV—IV of FIG. 3.

The side of the locking member 17 averted from the lining 18 is provided, as shown in FIG. 4, with two guide members 47 contacting the inner wall face of the chamber 16, and between these members provided with three bored projections 48. By means of a bolt 19 pushed through their bores the locking member 17 is pivotally connected with the end of an arm 20, which is likewise provided with projections 49 and whose other end, likewise provided with bored projections 50, carries a bolt 21, on which the lower end of the link 14, as well as the end of a second arm 22 is pivotally mounted which arm is provided with two bored projections 51. The other end of this arm is provided with three projections 52 and is pivotally connected by means of a bolt 53 with an abutment 23, which is guided slidably in, but restrained from turning relative to, the chamber 16. On this abutment a screw-threaded pin 57 is provided, which is in screw-connection with a screw-tapped bushing 24 mounted rotatably but restrained axially in the wall of the casing. By turning the bushing 24 the abutment 23 can be shifted within a limited range. A spring 27, which engages in a recess 26 of the casing 9 exerts pressure on the ends of the arms 20 and 22 through a sleeve 25, in which engages the conical end of the link 14. A firing key (not shown in the drawing) to be operated by the gunner forms a switch for a circuit including the solenoid 10.

The arrester device 61 for the elevation is diagrammatically illustrated in FIGS. 1 and 2. On the cradle 6 an internally toothed crow segment 58 is fixed, with which a manually rotatable pinion 59 is in mesh. On an extension 60 of the bearing bracket 40 a casing 9 is attached, wherein a locking member is slidable, which is provided with an elastically resilient lining 18 and with a solenoid 10. The construction of this arrester device is in detail the same as that described with reference to FIGS. 3 and 4, so that a renewed description can be dispensed with. Like the corresponding solenoid of the arrester device 62, this solenoid 10 is connected in the circuit of the firing key.

The manner of operation of the two arrester devices 61 and 62 results from the construction described as follows: for releasing a shot, the gunner actuates the firing key, whereby the circuits of the coils of the two solenoids 10 of both arrester devices are closed. Thereby both arrester devices are actuated simultaneously with the operation of the trigger, i.e. with the release of the breech 5 of the weapon, which is in the open position. The stem 12 of the solenoid 10 is thereby moved towards the chamber 16, so that the toggle joint formed by the two arms 20 and 22, shown in FIG. 3 in the broken position, is brought into the stretched position. Thus by the arm 20 the locking member 17 is pressed with its lining 18 against the toothing 32 on the carrier 33 and on the toothed segment 58, respectively, and the weapon is arrested in the position adjusted by the gunner before actuating the firing key by means of the manually operated gear wheels 45 and 59. The action of the two arrester devices becomes effective before the recoil force of the first shot of a cadence, on the one hand because the breech of the weapon after the energising of the solenoids 10 firstly moves from the catching position forward into the firing position, and on the other hand because a further time lag after the priming of the projectile-propelling charge occurs in the course of the shot.

Figure 5:
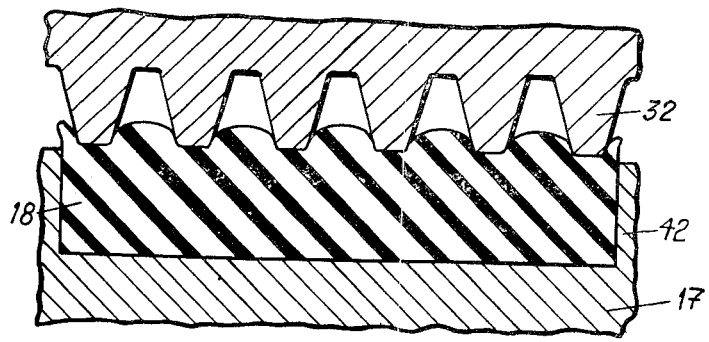
FIG. 5 is a scrap-view of FIG. 4 on yet a larger scale.

When pressing the locking member 17 against the toothed crown 32 or 58, the heads of the teeth penetrate into the lining 18, as illustrated in FIG. 5. The resistance to deformation produced by the parts of the lining 18 reaching into the interstices of the teeth and opposing any movement along the toothing 32, together with the frictional force occurring on those parts of the lining which contact the heads of the teeth, forms the arresting force. The fixing of the armour cupola 35 and of the cradle 6, respectively, is resilient owing to the elastic properties of the rubber lining 18; at the same time the lining 18 acts damping on the vibrations arising when firing, which results in an improvement of the firing accuracy of the gun.

For the purpose of interrupting the firing the gunner releases the firing key and thereby opens the circuits including the coils of the solenoids 10, so that the latter lose their holding power. The link 14 is then pushed back by the spring 27, the toggle joint is broken, and the lining 18 is retracted from the locking position.

Instead of a rubber lining 18 a lining consisting of a fabric of thin steel wires could be used such as obtainable under the trade name of "Vibra-choc."

While I have herein described and illustrated in the accompanying drawings what may be considered a typical and particularly useful embodiment of my said invention, I wish it to be understood that I do not limit myself to the particular details and dimensions described and illustrated; for obvious modifications wil occur to a person skilled in the art.

What I claim as my invention and desire to secure by Letters Patent, is:

1. In a gun mounting a carrier having an axis, a component carried by said carrier pivotably about said axis, locking means for arresting said pivotable component relative to said carrier, said locking means comprising an arc-shaped toothed rack attached to said carrier co-axially with said axis, a guideway arranged on said pivotable component radially directed relative to said toothed rack, a locking member slidable on said guideway between a rest position and an operative position, and a resilient body attached on said locking member and extending in the circumferential direction of said toothed rack over several teeth thereof, said resilient body being provided with an end face adjoining said rack, said end face in said rest position of said locking member being substantially plane and disengaged from said rack and in said operative position having an undulatory form entering the spaces between the teeth of said rack.

2. In a gun mounting a carrier having an axis, a component carried by said carrier pivotably about said axis, locking means for arresting said pivotable component relative to said carrier, said locking means comprising an arc-shaped toothed rack attached to said carrier co-axially with said axis, a guideway arranged on said pivotable component radially directed relative to said rack, a locking member provided with a recess and slidable on said guideway between a rest position and an operative position and a resilient body fastened in said recess and protruding beyond said locking member and extending in the circumferential direction of said rack over several teeth thereof, said resilient body being provided with an end face adjoining said rack, said end face in said rest position of said locking member being substantially plane and disengaged from said rack and in said operative position having an undulatory form entering the spaces between the teeth of said rack.

References Cited by the Examiner

FOREIGN PATENTS 82,098 12/1920 Austria.
290,131 6/1899 France.

BENJAMIN A. BORCHELT, *Primary Examiner.*

FRED C. MATTERN, *Examiner.*